United States Patent
Jung

(10) Patent No.: US 11,917,238 B2
(45) Date of Patent: Feb. 27, 2024

(54) WIRELESS DISPLAY SYSTEM AND METHOD FOR OPERATING SAME

(71) Applicant: LG ELECTRONICS INC., Seoul (KR)

(72) Inventor: Sungbo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 17/627,195

(22) PCT Filed: Aug. 27, 2019

(86) PCT No.: PCT/KR2019/010926
§ 371 (c)(1),
(2) Date: Jan. 14, 2022

(87) PCT Pub. No.: WO2021/040072
PCT Pub. Date: Mar. 4, 2021

(65) Prior Publication Data
US 2022/0321949 A1    Oct. 6, 2022

(51) Int. Cl.
*H04N 21/4363* (2011.01)
*H04N 21/422* (2011.01)

(52) U.S. Cl.
CPC . *H04N 21/43637* (2013.01); *H04N 21/42221* (2013.01)

(58) Field of Classification Search
CPC ....... H04N 21/43637; H04N 21/42221; H04N 21/43615; H04N 21/422
See application file for complete search history.

(56) References Cited

U.S. PATENT DOCUMENTS

| | | | |
|---|---|---|---|
| 2006/0044217 A1* | 3/2006 | Kim | H04N 5/46 345/2.1 |
| 2006/0046791 A1* | 3/2006 | Choi | H04N 21/43637 455/574 |
| 2007/0079339 A1* | 4/2007 | Hanabusa | H04N 21/4363 725/62 |

(Continued)

FOREIGN PATENT DOCUMENTS

| JP | 2009-656000 A | 3/2009 |
|---|---|---|
| KR | 10-2005-0060945 A | 6/2005 |

(Continued)

OTHER PUBLICATIONS

International Search Report for PCT/KR2019/010926 dated May 21, 2020.

*Primary Examiner* — Fernando Alcon
(74) *Attorney, Agent, or Firm* — Birch, Stewart, Kolasch & Birch, LLP

(57) ABSTRACT

The present invention relates to a wireless display system that minimizes a case in which a control signal does not reach a control target due to interference or the like when a remote control device transmits the control signal to a receiving module or a transmitting module, and a method for operating the same. The wireless display system includes a receiving module including a display unit, and a transmitting module configured to transmit, to the receiving module, an image to be output by the display unit. The receiving module and the transmitting module share a control signal received from a remote control device.

13 Claims, 6 Drawing Sheets

(a)

(b)

(56) References Cited

U.S. PATENT DOCUMENTS

| | | | | |
|---|---|---|---|---|
| 2010/0157167 A1* | 6/2010 | Lawther | ............. | H04N 21/4184 |
| | | | | 348/734 |
| 2014/0022461 A1* | 1/2014 | Kuo | ................... | H04N 21/482 |
| | | | | 348/734 |
| 2016/0094873 A1* | 3/2016 | Zou | ................. | H04N 21/43637 |
| | | | | 725/38 |
| 2016/0255391 A1* | 9/2016 | Noble | ................ | H04N 21/6583 |
| | | | | 725/81 |

FOREIGN PATENT DOCUMENTS

| | | |
|---|---|---|
| KR | 10-2013-0051153 A | 5/2013 |
| KR | 10-1639938 B1 | 7/2016 |
| KR | 10-2019-0042373 A | 4/2019 |

* cited by examiner (a)

(b)

(a)

(b)

WIRELESS DISPLAY SYSTEM AND METHOD FOR OPERATING SAME

CROSS REFERENCE TO RELATED APPLICATION

This application is the National Phase of PCT International Application No. PCT/KR2019/010926, filed on Aug. 27, 2019, which is hereby expressly incorporated by reference into the present application.

TECHNICAL FIELD

The present invention relates to a wireless display system and a method for operating the same.

BACKGROUND ART

As users increase interest in the design and aesthetics of display devices such as TVs, the thicknesses of the display devices are getting thinner. In addition, recently, a wireless display system has emerged in which a receiving module having a screen on which an image is displayed and a transmitting module receiving an image and transmitting the image to the receiving module are separated.

Accordingly, in the case of the wireless display system, only the receiving module may be installed on the wall, and the transmitting module including the remaining components may be provided in a living room cabinet or a chest of drawers. Therefore, since only the screen is displayed on the wall or the like, a separate line is not connected to improve the aesthetics.

However, in the case of the wireless display system, since the receiving module and the transmitting module may be disposed separately, the user tried to transmit a control signal to both sides through a remote control, but cannot reach at least one due to interference or the like, or there is a difference between the time it takes to reach both sides.

DISCLOSURE OF INVENTION

Technical Problem

The present invention aims to provide a wireless display system that minimizes a case in which a control signal does not reach a control target due to interference or the like when the control signal is transmitted to a receiving module or a transmitting module through a remote control device, and a method for operating the same.

The present invention aims to provide a wireless display system capable of synchronizing an operation timing between a receiving module and a transmitting module, and a method for operating the same.

Technical Solution

A wireless display system according to an embodiment of the present invention may include: a receiving module including a display unit; and a transmitting module configured to transmit, to the receiving module, an image to be output by the display unit, wherein the receiving module and the transmitting module may share a control signal received from a remote control device.

The receiving module may be configured to transmit, to the transmitting module, the control signal received from the remote control device, and the transmitting module may be configured to transmit, to the receiving module, the control signal received from the remote control device.

When the transmitting module is included in a target of the control signal received from the remote control device, the receiving module may be configured to transmit, to the transmitting module, the control signal received from the remote control device, and when the receiving module is included in the target of the control signal received from the remote control device, the transmitting module may be configured to transmit, to the receiving module, the control signal received from the remote control device.

The receiving module may include: a first control signal receiving unit configured to receive the control signal from the remote control device; a first control signal determining unit configured to obtain a control target of the control signal received by the first control signal receiving unit; and a first control signal transmitting unit configured to transmit the control signal to the transmitting module when the transmitting module is included in the control target of the control signal.

The transmitting module may include: a second control signal receiving unit configured to receive the control signal from the remote control device; a second control signal determining unit configured to obtain a control target of the control signal received by the second control signal receiving unit; and a second control signal transmitting unit configured to transmit the control signal to the receiving module when the receiving module is included in the control target of the control signal.

One of the receiving module and the transmitting module may be configured to communicate with the remote control device through IR communication, and the other thereof may be configured to communicate with the remote control device through Bluetooth communication.

The receiving module may be configured to receive the control signal from the remote control device through the IR communication, and the transmitting module may be configured to receive the control signal from the remote control device through the Bluetooth communication.

The wireless display system may further include a remote control device including an IR communication module and a Bluetooth communication module.

At least one of the receiving module and the transmitting module that receives the control signal from the remote control device through Bluetooth communication may be configured to perform pairing with the remote control device.

A frequency band of a communication signal between the receiving module and the remote control device, a frequency band of a communication signal between the transmitting module and the remote control device, and a frequency band of a communication signal between the receiving module and the transmitting module may be different from one another.

A method for operating a wireless display system according to an embodiment of the present invention may include: transmitting, by a transmitting module, an audio/video (AV) signal to a receiving module; outputting, by the transmitting module, an image according to the AV signal; receiving, by the transmitting module or the receiving module, a control signal from a remote control device; and sharing, by the transmitting module or the receiving module, the control signal received from the remote control device.

The sharing of the control signal may include: transmitting, by the transmitting module, the control signal received from the remote control device to the receiving module; and transmitting, by the receiving module, the control signal received from the remote control device to the transmitting module.

The method may further include determining, by one of the transmitting module and the receiving module that has received the control signal, whether the other thereof is included in a control target of the control signal.

The receiving of the control signal from the remote control device may include: receiving, by the transmitting module, the control signal from the remote control device through Bluetooth communication; and receiving, by the receiving module, the control signal from the remote control device through IR communication.

The wireless display system may further include performing, by at least one of the receiving module and the transmitting module that receives the control signal from the remote control device through Bluetooth communication, pairing with the remote control device.

Advantageous Effects

According to an embodiment of the present invention, since a control signal is shared between a receiving module and a transmitting module, it is possible to minimize a case in which the receiving module or the transmitting module does not receive a control signal, thereby improving control accuracy.

In addition, since the control signal is shared between the receiving module and the transmitting module, simultaneous operation is possible even if there is a time difference or phase difference between the control signal arriving at the receiving module and the control signal arriving at the transmitting module.

BEST MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

It will be understood that although the terms "first," "second" etc. may be used herein to describe various elements, these elements should not be limited by these terms. These terms are only used to distinguish one element from another.

The singular forms "a," "an," and "the" as used herein are intended to include the plural forms as well unless the context clearly indicates otherwise.

The terms "comprises," "comprising," "including," and "having," as used in this application are inclusive and therefore specify the presence of stated features, integers, steps, operations, elements, or components, but do not preclude the presence or addition of one or more other features, integers, steps, operations, elements, components, or combinations thereof.

Figure 1:
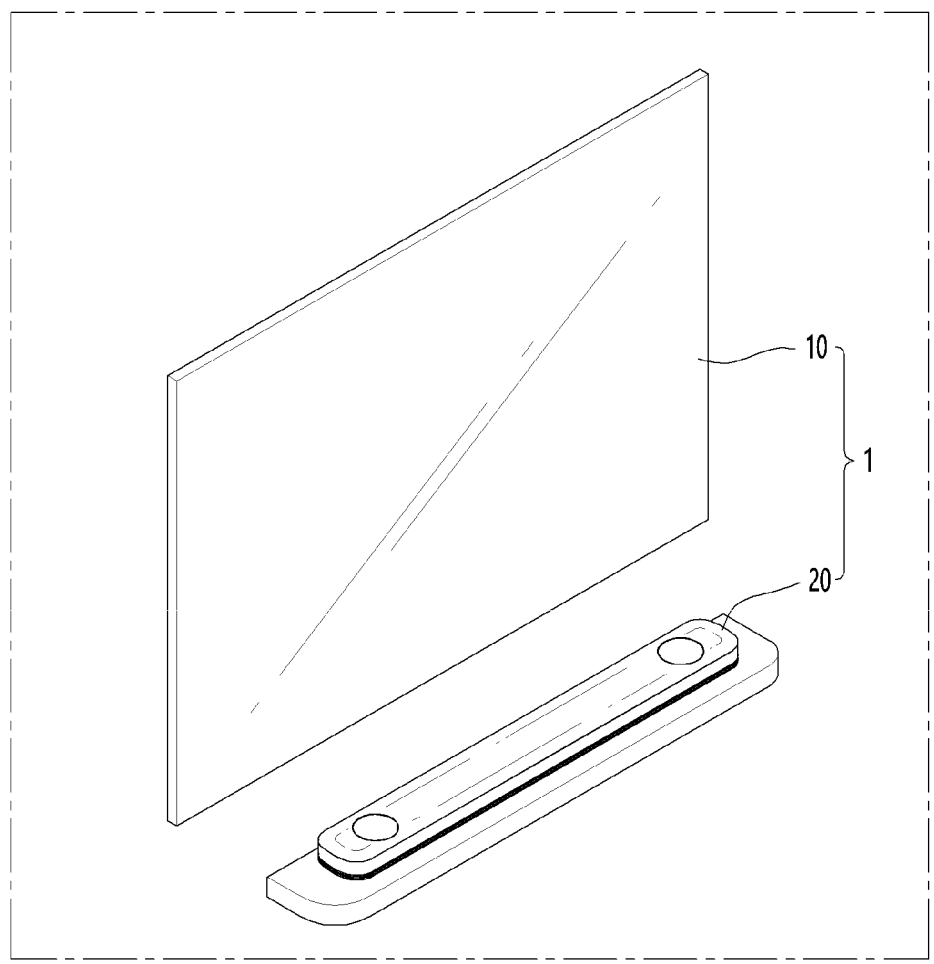
FIG. 1 is a perspective view illustrating a wireless display system.

FIG. 1 is a perspective view illustrating a wireless display system.

A wireless display system 1 may include a receiving module 10 and a transmitting module 20.

The receiving module 10 may be installed to be fixed to a wall or the like.

A screen on which an image is displayed may be formed in the receiving module 10. The receiving module 10 may include a display unit (see 18 of FIG. 2) for displaying an image.

The display unit 18 may be implemented as one of various panels. For example, the display unit 18 may include one of a liquid crystal display panel (LCD panel), an organic light emitting panel (OLED panel), and an inorganic light emitting panel (LED panel).

The receiving module 10 may receive an audio/video (AV) signal from the transmitting module 20, and may display an image on the display unit 18 through the received AV signal.

The receiving module 10 may wirelessly receive the AV signal from the transmitting module 20. For example, the receiving module 10 and the transmitting module 20 may transmit or receive the AV signal in a 60 GHz band. However, since the frequency bands in which the receiving module 10 and the transmitting module 20 transmit or receive the AV signal are merely exemplary, the present invention is not limited thereto.

On the other hand, when receiving the AV signal from the transmitting module 20, the receiving module 10 may also receive a control signal for controlling an image.

The transmitting module 20 may be spaced apart from the receiving module 10. That is, since the receiving module 10 and the transmitting module 20 wirelessly transmit or receive signals, the position of the transmitting module 20 may be changed.

The transmitting module 20 may be located in an open space. Alternatively, the transmitting module 20 may be located inside a living cabinet or a chest of drawers. In this case, since the transmitting module 20 is covered by the living cabinet or the chest of drawers, etc., the installation environment of the wireless display system 1 can be created more neatly.

Figure 3:
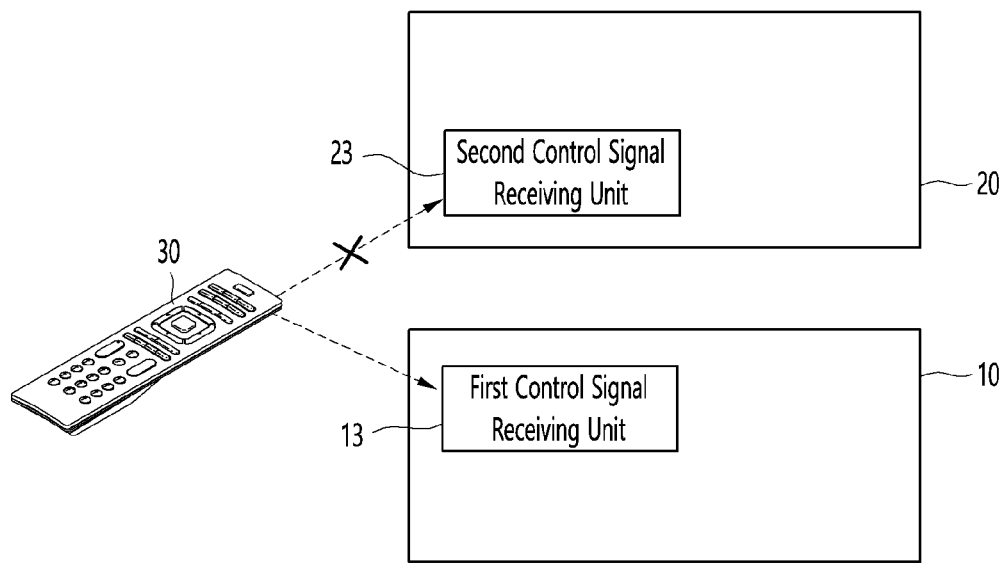
FIG. 3 is an exemplary diagram illustrating a problem that occurs when a control signal is received from a remote control device in the wireless display system.
Figure 3:
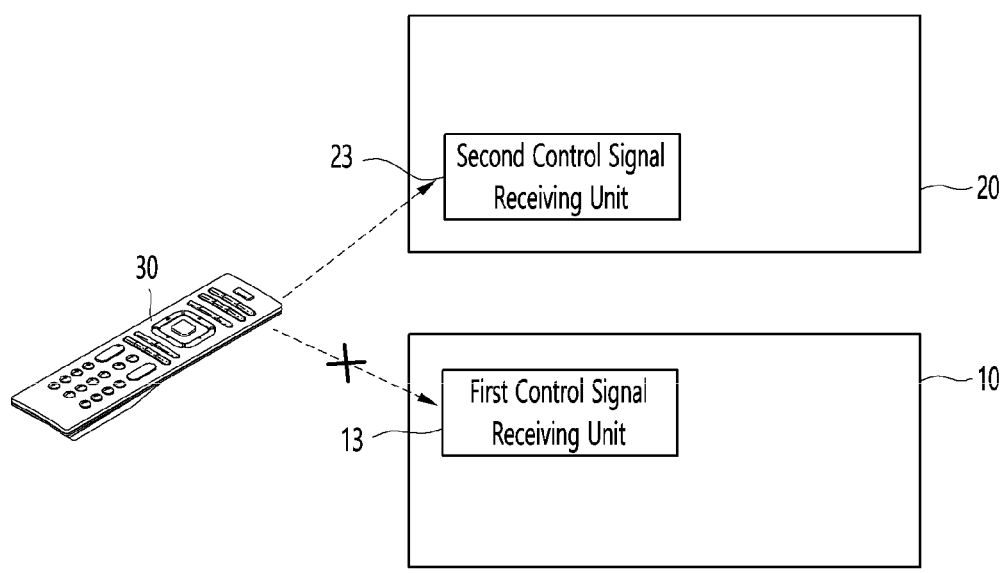

The receiving module 10 and the transmitting module 20 may receive the control signal from the remote control device (see 30 of FIG. 3).

For example, the receiving module 10 and the transmitting module 20 may individually receive a power on/off signal from the remote control device 30, and power can be controlled according to the received power on/off signal.

Figure 2:
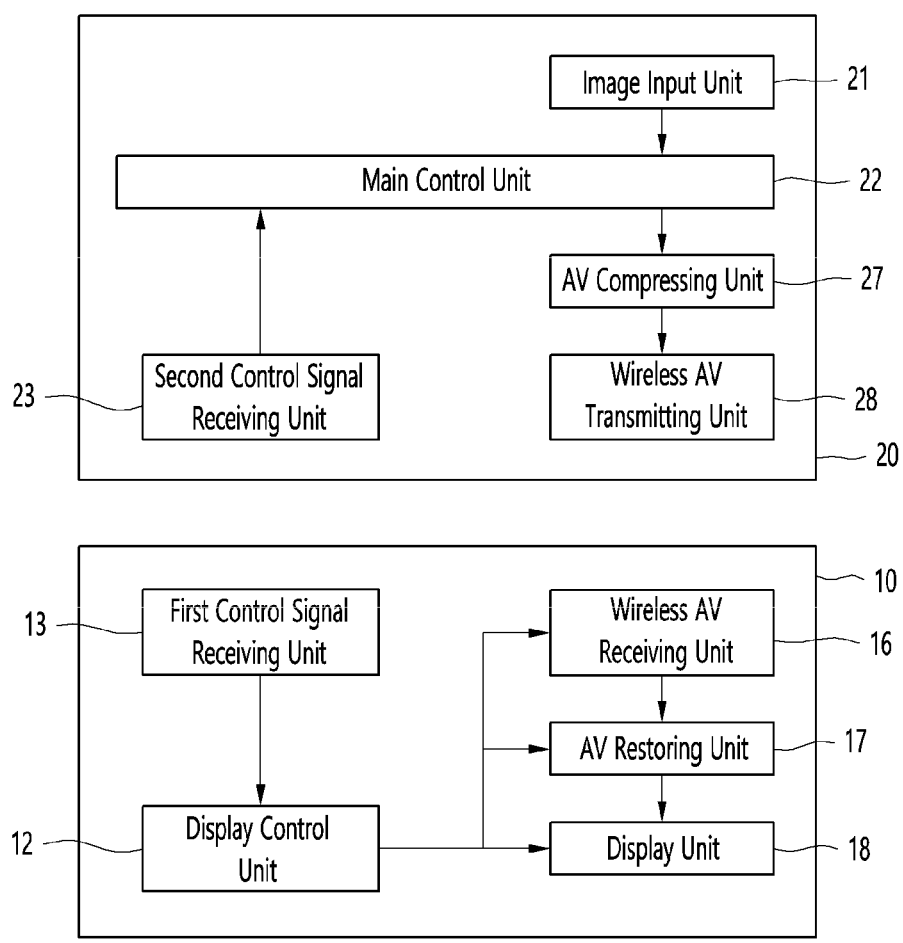
FIG. 2 is a control block diagram of the wireless display system illustrated in FIG. 1.

FIG. 2 is a control block diagram of the wireless display system illustrated in FIG. 1.

The receiving module 10 may include at least part or all of a display control unit 12, the first control signal receiving unit 13, a wireless AV receiving unit 16, an AV restoring unit 17, and a display unit 18.

The transmitting module 20 may include at least part or all of an image input unit 21, a main control unit 22, a second control signal receiving unit 23, an AV compressing unit 27, and a wireless AV transmitting unit 28.

First, a detailed configuration of the receiving module 10 will be described.

The display control unit 12 may control each of the first control signal receiving unit 13, the wireless AV receiving unit 16, the AV restoring unit 17, and the display unit 18.

The display control unit 12 may control overall operations of the receiving module 10. For example, the display control unit 12 may receive the AV signal from the transmitting module 20 and may control the wireless AV receiving unit 16, the AV restoring unit 17, and the display unit 18 to display an image by using the received AV signal.

The first control signal receiving unit 13 may receive, from the remote control device 30, a signal for controlling the receiving module 10.

The first control signal receiving unit 13 may transmit the control signal received from the remote control device 30 to the display control unit 12, so that the display control unit 12 can operate according to the control signal.

The wireless AV receiving unit 16 may receive the AV signal from the transmitting module 20, in particular, the wireless AV transmitting unit 28.

The AV restoring unit 17 may restore the AV signal received from the wireless AV receiving unit 16. For example, the transmitting module 20 may compress the AV signal and then transmit the compressed AV signal to the receiving module 10, and the receiving module 10 may restore the compressed AV signal through the AV restoring unit 17 and input the restored AV signal to the display unit 18.

The display unit 18 may output an image based on the restored AV signal.

On the other hand, the receiving module 10 may further include other components in addition to the components illustrated in FIG. 2. That is, the configuration of the receiving module 10 illustrated in FIG. 2 is only given as an example for convenience of description, and thus the present invention is not limited thereto.

For example, the receiving module 10 may further include an audio output unit (not illustrated) for outputting sound in accordance with the image output from the display unit 18. Alternatively, the audio output unit (not illustrated) may be wirelessly connected to the transmitting module 20 so as to be separately present.

First, a detailed configuration of the transmitting module 20 will be described.

The main control unit 22 may control each of the image input unit 21, the second control signal receiving unit 23, the AV compressing unit 27, and the wireless AV transmitting unit 28.

The image input unit 21 may receive an image to be displayed on the display unit 18. For example, the image input unit 21 may include a broadcast receiving unit (not illustrated) that receives a radio frequency (RF) broadcast signal.

In addition, the image input unit 21 may include an external device interface unit (not illustrated) that can be wirelessly or wiredly connected to an external device such as a digital versatile disk (DVD), Blu-ray, a game console, a camera, a camcorder, a computer (notebook), or a set-top box.

In addition, the image input unit 21 may include a network interface unit (not illustrated) for connecting to a wired/wireless network including an Internet network. The network interface unit (not illustrated) may include a wireless communication unit.

As described above, the image input unit 21 may include various interface units for receiving an image from the outside.

The main control unit 22 may control the AV compressing unit 27 and the wireless AV transmitting unit 28 to transmit the image input from the image input unit 21 to the receiving module 10.

The AV compressing unit 27 may compress the image input through the image input unit 21. The AV compressing unit 27 may transmit the compressed image to the wireless AV transmitting unit 28.

The wireless AV transmitting unit 28 may receive the image from the AV compressing unit 27. The image that the wireless AV transmitting unit 28 receives from the AV compressing unit 27 may be a compressed image.

The wireless AV transmitting unit 28 may transmit the compressed AV signal to the receiving module 10.

The second control signal receiving unit 23 may receive, from the remote control device 30, a signal for controlling the transmitting module 20.

The second control signal receiving unit 23 may transmit the control signal received from the remote control device 30 to the main control unit 22, so that the main control unit 22 can operate according to the control signal.

Since 'display' in the display control unit 12 and 'main' in the main control unit 22 are only named to distinguish the control unit provided in the receiving module 10 and the control unit provided in the transmitting module 20, respectively, it is obvious that the present invention is not limited to these names.

The display control unit 12 and the main control unit 22 may be implemented as a system on chip (SoC).

On the other hand, the receiving module 10 and the transmitting module 20 each include a receiving unit for receiving a control signal. That is, the receiving module 10 includes the first control signal receiving unit 13 for receiving a control signal from the remote control device 30, and the transmitting module 20 includes the second control signal receiving unit 23 for receiving a control signal from the remote control device 30.

The remote control device 30 may transmit or receive signals to and from the receiving module 10 and the transmitting module 20 through IR communication or Bluetooth communication.

The remote control device 30 may include both an IR communication module and a Bluetooth communication module.

In this case, the first control signal receiving unit 13 and the second control signal receiving unit 23 may be controlled through the same remote control device 30. For example, when the remote control device 30 receives the power on/off signal, the remote control device 30 may transmit the power on/off signal to each of the receiving module 10 and the transmitting module 20.

As a specific example, when the power-off signal is received from the remote control device 30 while each of the receiving module 10 and the transmitting module 20 is in a power-on state, each of the receiving module 10 and the transmitting module 20 may change power from an on-state to an off-state. Similarly, when the power-on signal is received from the remote control device 30 while each of the receiving module 10 and the transmitting module 20 is in a power-off state, each of the receiving module 10 and the transmitting module 20 may change power from an off-state to an on-state.

As such, the remote control device 30 transmits the control signal to each of the receiving module 10 and the transmitting module 20, but one of the receiving module 10 and the transmitting module 20 may not receive the control signal due to interference.

As an example, in the case in which the receiving module 10 is present in the front with respect to the user viewing position and the transmitting module 20 is present in the rear with respect to the user viewing position, when the user transmits the control signal toward the front by using the remote control device 30, the transmitting module 20 may not receive the control signal.

FIG. 3 is an exemplary diagram illustrating a problem that occurs when the control signal is received from the remote control device in the wireless display system.

As in the example illustrated in (a) of FIG. 3, when the remote control device 30 transmits the control signal to each of the receiving module 10 and the transmitting module 20, only the receiving module 10 may receive the control signal and the transmitting module 20 may not receive the control signal. As in the example illustrated in (b) of FIG. 3, when the remote control device 30 transmits the control signal to each of the receiving module 10 and the transmitting module 20, only the transmitting module 20 may receive the control signal and the receiving module 10 may not receive the control signal.

Therefore, when the remote control device 30 transmits the power-on signal to the receiving module 10 and the transmitting module 20, but only the receiving module 10 receives the power-on signal and the transmitting module 20 does not receive the power-on signal, only the receiving module 10 is controlled to be in a power-on state, and the transmitting module 20 may maintain a power-off state. The same is applied to the opposite case.

As another example, each of the receiving module 10 and the transmitting module 20 receives the control signal, but a difference may occur between the time when the receiving module 10 receives the control signal and the time when the transmitting module 20 receives the control signal. In this case, the operation timing of the receiving module 10 and the operation timing of the transmitting module 20 may be changed.

Therefore, since the wireless display system 1 according to an embodiment of the present invention shares the control signal received from the remote control device 30 between the receiving module 10 and the transmitting module 20, it is intended to minimize the occurrence of signal non-response due to interference and to allow the receiving module 10 and the transmitting module 20 to operate at the same time.

Figure 4:
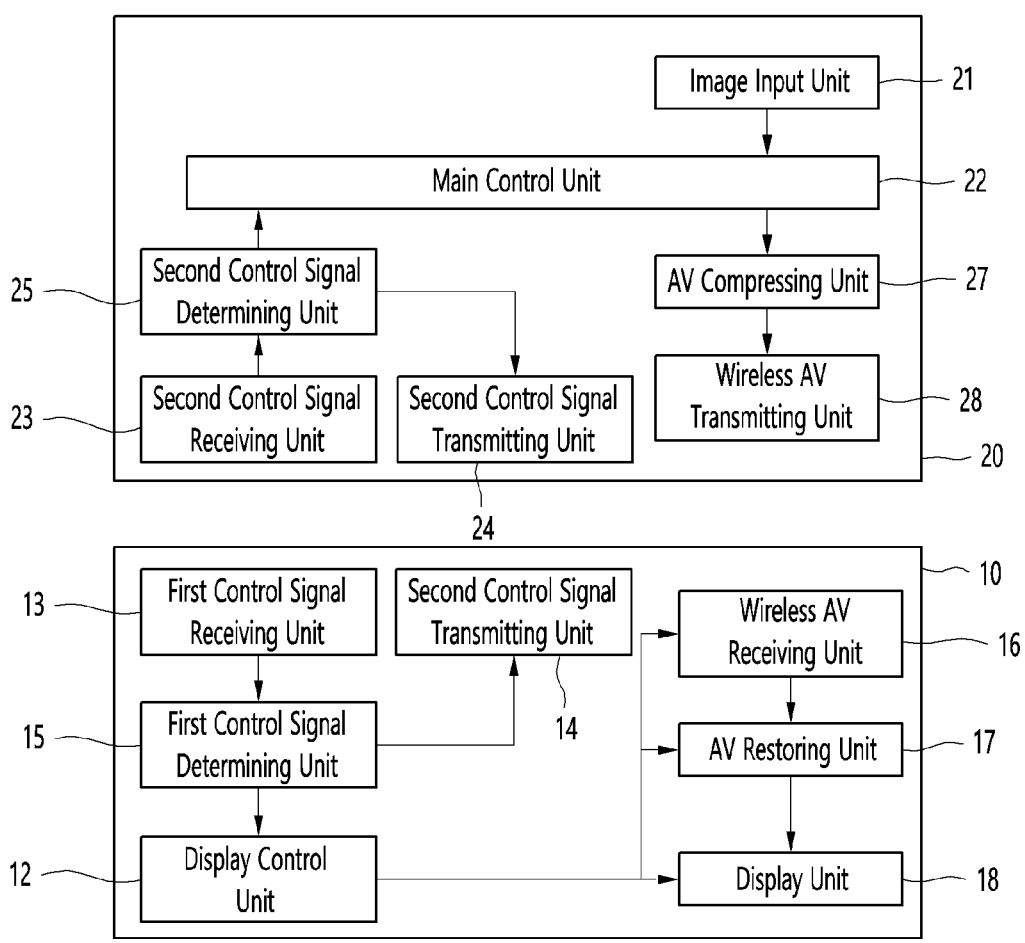
FIG. 4 is a control block diagram of the wireless display system according to an embodiment of the present invention.

FIG. 4 is a control block diagram of the wireless display system according to an embodiment of the present invention.

A wireless display system 1 may include a receiving module 10 and a transmitting module 20. The wireless display system 1 may further include a remote control device 30.

The receiving module 10 may include a display unit 18, and the transmitting module 20 may transmit, to the receiving module 10, an image to be output by the display unit 18.

In this case, the receiving module 10 and the transmitting module 20 may share the control signal received from the remote control device 30.

Specifically, the receiving module 10 may includes at least part or all of a display control unit 12, a first control signal receiving unit 13, a first control signal transmitting unit 14, a first control signal determining unit 15, a wireless AV receiving unit 16, an AV restoring unit 17, and a display unit 18.

Compared with FIG. 2, the receiving module 10 of the wireless display system 10 according to an embodiment of the present invention may further include the first control signal transmitting 14 and the first control signal determining unit 15.

Since components other than the first control signal transmitting unit 14 and the first control signal determining unit 15 are the same as those described with reference to FIG. 2, redundant descriptions thereof will be omitted.

Similarly, the transmitting module 20 may include at least part or all of an image input unit 21, a main control unit 22, a second control signal receiving unit 23, a second control signal transmitting unit 24, a second control signal determining unit 25, an AV compressing unit, and a wireless AV transmitting unit 28.

Compared with FIG. 2, the transmitting module 20 of the wireless display system 10 according to an embodiment of the present invention may further include a second control signal transmitting unit 24 and a second control signal determining unit 25.

Since components other than the second control signal transmitting unit 24 and the second control signal determining unit 25 are the same as those described with reference to FIG. 2, redundant descriptions thereof will be omitted.

On the other hand, in FIG. 4, the first control signal receiving unit 13 and the first control signal transmitting unit 14 are separated, but this is for convenience of description. The first control signal receiving unit 13 and the first control signal transmitting unit 14 may be formed as one communication module. Similarly, the second control signal receiving unit 23 and the second control signal transmitting unit 24 may also be formed as one communication module.

According to an embodiment of the present invention, the frequency bands in which each of the first control signal receiving unit 13 and the second control signal receiving unit 34 receives a signal may be different from each other.

For example, one of the first control signal receiving unit 13 and the second control signal receiving unit 23 may receive the control signal through a Bluetooth frequency band, and the other thereof may receive the control signal through IR.

In particular, the first control signal receiving unit 13 may receive the control signal through IR, and the second control signal receiving unit 23 may receive the control signal through a Bluetooth frequency band. Since the receiving module 10 is generally installed on a wall or the like, the possibility that an interfering obstacle will exist between the receiving module 10 and the remote control device 30 may be lower than the possibility that an interfering obstacle will exist between the transmitting module 20 and the remote control device 30. Therefore, the receiving module 10 may receive the control signal through IR, and the transmitting module 20 may receive the control signal through the Bluetooth frequency band.

As such, when the transmitting module 20 receives the control signal through Bluetooth, the interference caused by the structure between the remote control device 30 and the transmitting module 20 is minimized. Therefore, there is an advantage that the position of the transmitting module 20 can be changed more freely.

The following description will be given on the assumption that the receiving module 10 receives the control signal from the remote control device 30 through the IR and the transmitting module 20 receives the control signal from the remote control device 30 through the Bluetooth frequency band, but the present invention is not limited thereto. That is, the first control signal receiving unit 13 may receive the control signal through the Bluetooth frequency band, and the second control signal receiving unit 13 may receive the control signal through the IR.

The remote control device 30 may transmit the control signal to each of the receiving module 10 and the transmitting module 20.

The remote control device 30 may transmit the control signal through Bluetooth communication and simultaneously transmit the control signal through IR communication.

For example, the remote control device 30 may transmit the control signal to the transmitting module 20 through Bluetooth communication and may transmit the control signal to the receiving module 10 through IR communication.

The first control signal receiving unit 13 may transmit the received control signal to the first control signal determining unit 15.

The first control signal determining unit 15 may obtain the contents of the control signal. For example, the first control signal determining unit 15 may obtain a control target, control contents, and the like of the control signal. According to the control contents of the control signal, the control target may be only the receiving module 10, may be only the transmitting module 20, and may be both the receiving module 10 and the transmitting module 20.

The first control signal determining unit 15 may determine whether the transmitting module 20 is included in the control target of the control signal.

When the transmitting module 20 is included in the control target of the control signal, the first control signal determining unit 15 may transmit the control signal to the first control signal transmitting unit 14 so that the control signal is shared.

When the first control signal transmitting unit 14 receives the control signal from the first control signal determining unit 15, the first control signal transmitting unit 14 may transmit the control signal to the transmitting module 20.

Similarly, the second control signal receiving unit 23 may transmit the received control signal to the second control signal determining unit 25.

The second control signal determining unit 25 may obtain the contents of the control signal. For example, the second control signal determining unit 25 may obtain a control target, control contents, and the like of the control signal. According to the control contents of the control signal, the control target may be only the receiving module 10, may be only the transmitting module 20, and may be both the receiving module 10 and the transmitting module 20.

The second control signal determining unit 25 may determine whether the receiving module 10 is included in the control target of the control signal.

When the receiving module 10 is included in the control target of the control signal, the second control signal determining unit 25 may transmit the control signal to the second control signal transmitting unit 24 so that the control signal is shared.

When the second control signal transmitting unit 24 receives the control signal from the second control signal determining unit 25, the second control signal transmitting unit 14 may transmit the control signal to the receiving module 10.

As such, the wireless display system according to a first embodiment of the present invention may share the control signal received from the remote control device 30.

Figure 5:
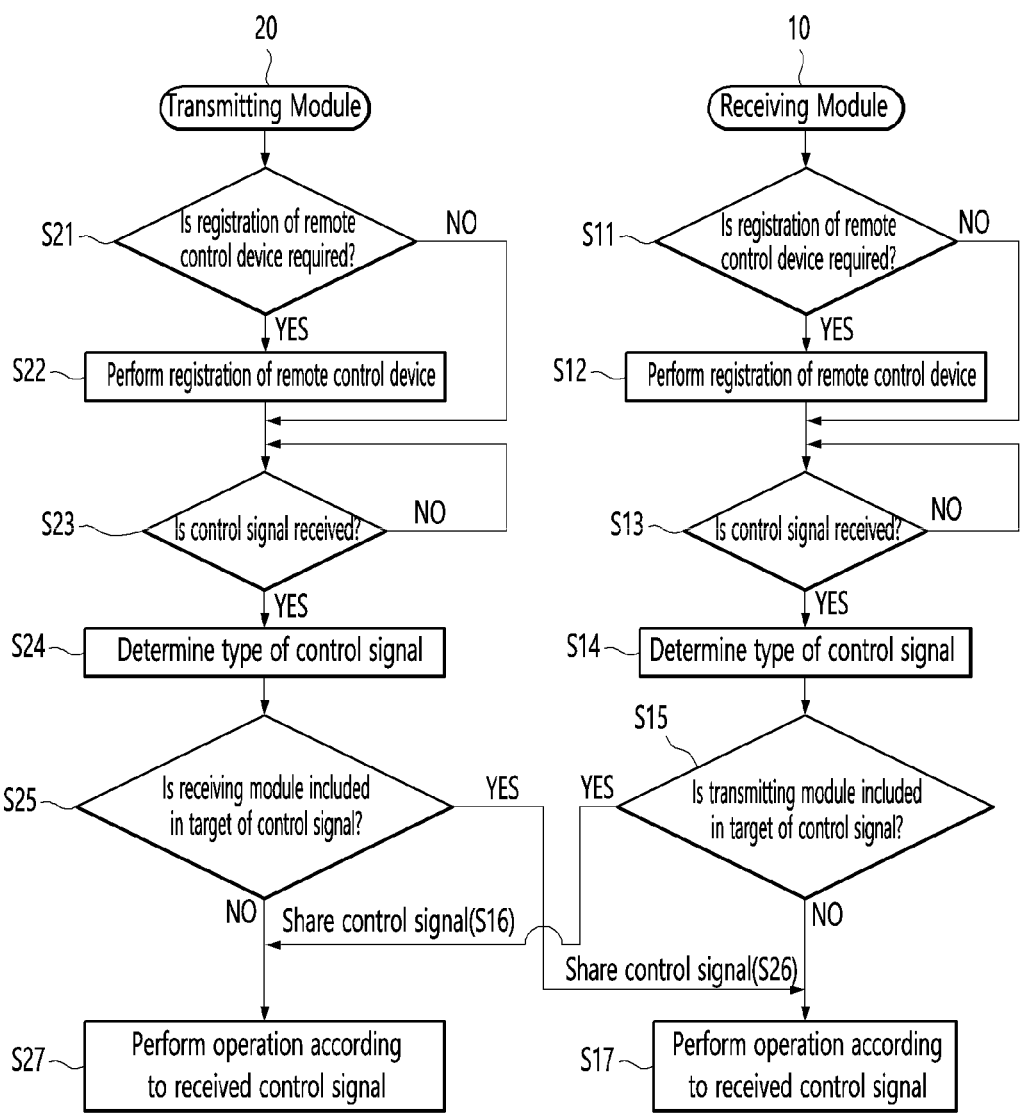
FIG. 5 is a flowchart illustrating a method for operating a wireless display system according to an embodiment of the present invention.

FIG. 5 is a flowchart illustrating the method for operating the wireless display system according to an embodiment of the present invention.

The receiving module 10 may determine whether the registration of the remote control device 30 is required (S11).

When the receiving module 10 is initialized or when the remote control device 30 is initialized, the registration of the remote control device 30 may be required. In particular, when the first control signal receiving unit 13 receives the control signal from the remote control device 30 through Bluetooth communication, the registration for pairing with the remote control device 30 may be required for the first time.

When the registration of the remote control device 30 is required, the display control unit 12 may perform the registration of the remote control device 30 (S12).

For example, the display control unit 12 may perform pairing with the remote control device 30.

That is, at least one of the receiving module 10 and the transmitting module 20 that receives the control signal from the remote control device 30 through Bluetooth communication may perform pairing with the remote control device 30.

When the registration of the remote control device 30 is not required or when the registration of the remote control device 30 is performed, the display control unit 12 may determine whether the control signal has been received (S13).

The display control unit 12 may obtain whether the control signal is received from the remote control device 30.

When the control signal is not received from the remote control device 30, the display control unit 12 may continuously determine whether the control signal is received from the remote control device 30.

When the display control unit 12 receives the control signal from the remote control device 30, the display control unit 12 may determine a type of the control signal (S14).

The control signal is a signal for controlling the wireless display system, and may refer to a signal for controlling the operation of the wireless display system that receives the control signal from the user through the remote control device 30. For example, the control signal may include a power on/off signal, a channel up/down signal, and a volume up/down signal.

Determining the type of the control signal may include determining the contents of the control signal, the control target of the control signal, and the like.

When the display control unit 12 receives the control signal from the remote control device 30, the display control unit 12 may control the first control signal determining unit 15 to determine the contents of the control signal, the control target of the control signal, and the like.

After determining the type of the control signal, the display control unit 12 may determine whether the transmitting module 20 is included in the target of the control signal (S15).

That is, one of the transmitting module 20 and the receiving module 10 that has received the control signal may determine whether the other thereof is included in the control target of the control signal.

When the transmitting module 20 is included in the control target of the control signal, the display control unit 12 may share the control signal (S16).

That is, when the transmitting module 20 is included in the control target of the control signal, the display control unit 12 may control the first control signal transmitting unit 14 to transmit the control signal to the transmitting module 20.

When the receiving module 10 and the transmitting module 20 are included in the control target of the control signal, the display control unit 12 not only transmits the control signal to the transmitting module 20 but also performs an operation according to the received control signal. That is, when the control signal is shared, the display control unit 12 may perform an operation according to the control signal, depending on whether the receiving module 10 is included in the control target of the control signal. That is, when the receiving module 10 is included in the control target of the control signal, the display control unit 10 may perform an operation according to the control signal, regardless of whether the control signal is shared.

When the transmitting module 20 is not included in the target of the control signal, the display control unit 12 may perform an operation according to the received control signal without sharing the control signal (S17).

That is, when the transmitting module 20 is not included in the control target of the control signal, the display control unit 12 does not share the control signal.

The transmitting module 20 may also operate similarly to the receiving module 10, which will be described in detail below.

Specifically, the transmitting module 20 may determine whether the registration of the remote control device 30 is required (S21).

When the transmitting module 20 is initialized or when the remote control device 30 is initialized, the registration of the remote control device 30 may be required. In particular, when the second control signal receiving unit 23 receives the control signal from the remote control device 30 through Bluetooth communication, the registration for pairing with the remote control device 30 may be required for the first time.

When the registration of the remote control device 30 is required, the main control unit 22 may perform the registration of the remote control device 30 (S22).

For example, the main control unit 22 may perform the registration of the remote control device 30 by performing pairing with the remote control device 30.

When the registration of the remote control device 30 is not required or when the registration of the remote control device 30 is completed, the main control unit 22 may determine whether the control signal has been received (S23).

The main control unit 22 may obtain whether the control signal is received from the remote control device 30.

When the main control unit 22 does not receive the control signal from the remote control device 30, the main control unit 22 may continuously determine whether the control signal is received from the remote control device 30.

When the main control unit 22 receives the control signal from the remote control device 30, the main control unit 22 may determine the type of the control signal (S24).

As described above in operation S14, the control signal is a signal for controlling the wireless display system, and may refer to a signal for controlling the operation of the wireless display system that receives the control signal from the user through the remote control device 30. For example, the control signal may include a power on/off signal, a channel up/down signal, and a volume up/down signal.

Determining the type of the control signal may include determining the contents of the control signal, the control target of the control signal, and the like.

When the main control unit 22 receives the control signal from the remote control device 30, the main control unit 22 may control the second control signal determining unit 25 to determine the contents of the control signal, the control target of the control signal, and the like.

After determining the type of the control signal, the main control unit 22 may determine whether the receiving module 10 is included in the control target of the control signal (S25).

When the receiving module 10 is included in the control target of the control signal when, the main control unit 22 may share the control signal (S26).

That is, when the receiving module 10 is included in the control target of the control signal, the main control unit 22 may control the second control signal transmitting unit 24 to transmit the control signal to the receiving module 10.

When the receiving module 10 and the transmitting module 20 are included in the control target of the control signal, the main control unit 22 not only transmits the control signal to the receiving module 10 but also performs an operation according to the received control signal. That is, when the control signal is shared, the main control unit 22 may perform an operation according to the control signal, depending on whether the transmitting module 20 is included in the control target of the control signal. That is, when the transmitting module 20 is included in the control target of the control signal, the main control unit 22 may perform an operation according to the control signal, regardless of whether the control signal is shared.

When the receiving module 10 is not included in the target of the control signal, the main control unit 22 may perform an operation according to the received control signal without sharing the control signal (S27).

When the main control unit 22 performs an operation according to the received control signal, the main control unit 22 may control components in the transmitting module 20 to perform an operation according to the control signal.

That is, when the receiving module 10 is not included in the control target of the control signal, the main control unit 22 does not share the control signal.

Figure 6:
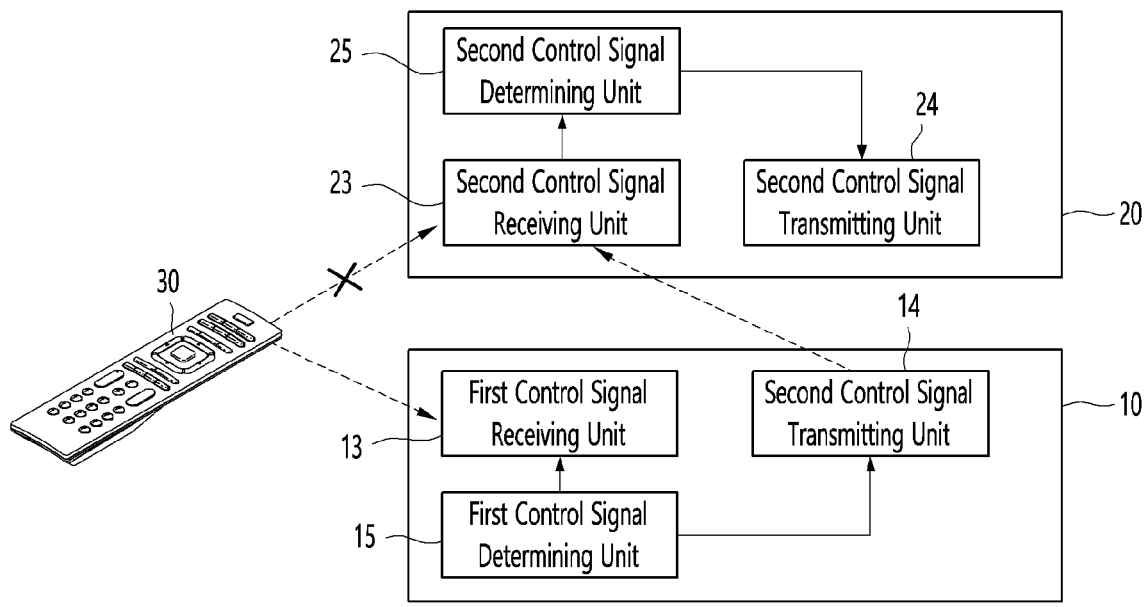
FIG. 6 is an exemplary diagram illustrating the operation of the wireless display system according to an embodiment of the present invention.
Figure 6:
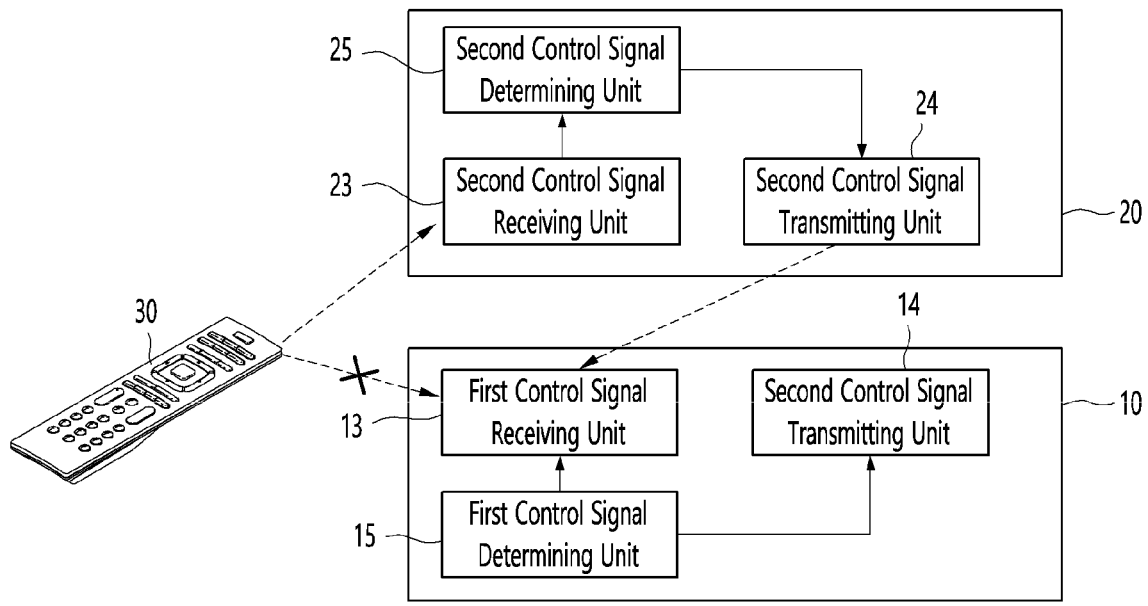

FIG. 6 is an exemplary diagram illustrating the operation of the wireless display system according to an embodiment of the present invention.

Referring to the example illustrated in (a) of FIG. 6, when the remote control device 30 transmits the control signal to each of the receiving module 10 and the transmitting module 20, only the receiving module 10 may receive the control signal, and the transmitting module 20 may not receive the control signal. In this case, the first control signal receiving unit 13 of the receiving module 10 may transmit the received control signal to the first control signal determining unit 15, and the first control signal determining unit 15 may determine whether the transmitting module 20 is included in the control target by determining the control target of the control signal. When the transmitting module 20 is included in the control target of the control signal, the first control signal determining unit 15 may transmit the control signal to the first control signal transmitting unit 14. The first control signal transmitting unit 14 may transmit the control signal to the transmitting module 20, and the second control signal receiving unit 23 of the transmitting module 20 may receive the control signal.

Similarly, referring to the example illustrated in (b) of FIG. 6, when the remote control device 30 transmits the control signal to each of the receiving module 10 and the transmitting module 20, only the transmitting module 20 may receive the control signal, and the receiving module 10 may not receive the control signal. In this case, the second control signal receiving unit 23 of the transmitting module 20 may transmit the received control signal to the second control signal determining unit 25, and the second control signal determining unit 25 may determine whether the receiving module 10 is included in the control target by determining the control target of the control signal. When the receiving module 10 is included in the control target of the control signal, the second control signal determining unit 25 may transmit the control signal to the second control signal transmitting unit 24. The second control signal transmitting unit 24 may transmit the control signal to the receiving module 10, and the first control signal receiving unit 13 of the receiving module 10 may receive the control signal.

As such, when the receiving module 10 and the transmitting module 20 are included in the control target transmitted by the remote control device 30, but one of the receiving module 10 and the transmitting module 20 does not receive the control signal, the control signal can be received through the other. Therefore, it is possible to minimize the problem that the receiving module 10 or the transmitting module 20 does not receive the control signal and thus does not perform an operation.

In addition, as in the present invention, when the receiving module 10 and the transmitting module 20 share the control signal, the receiving module 10 and the transmitting module 20 may operate at the same time. That is, even when there is a time difference/phase difference in which the receiving module 10 and the transmitting module 20 receive the control signal due to interference or obstacles, the shared control signal may be compared and determined to perform signal processing so that the receiving module 10 and the transmitting module 20 operate at the same time.

On the other hand, in the example illustrated in (a) and (b) of FIG. 6, when the first control signal receiving unit 13 receives the control signal through IR communication and the second control signal receiving unit 23 receives the control signal through Bluetooth communication, the first control signal transmitting unit 14 may transmit the control signal to the transmitting module 20 through Bluetooth communication, and the second control signal transmitting unit 25 may transmit the control signal to the receiving module 10 through IR communication.

In addition, in FIGS. 4 to 6, it has been described that one of the receiving module 10 and the transmitting module 30 receives the control signal from the remote control device 30 through Bluetooth communication, and the other thereof receives the control signal from the remote control device 30 through IR communication, but the present invention is not limited thereto.

That is, according to another embodiment of the present invention, the receiving module 10 and the transmitting module 30 may receive the control signal from the remote control device 30 through the same frequency band. For example, the receiving module 10 and the transmitting module 30 may receive the control signal from the remote control device 30 through Bluetooth communication, and as another example, the receiving module 10 and the transmitting module 20 may receive the control signal from the remote control device 30 through IR communication.

In addition, although it has been described that the receiving module 10 or the transmitting module 30 communicates with the remote control device 30 through Bluetooth or IR, this is also merely exemplary. That is, the receiving module 10 or the transmitting module 30 may communicate with the remote control device 30 through various wireless communication technologies.

On the other hand, in the wireless display system according to an embodiment of the present invention, a frequency band of a communication signal between the receiving module 10 and the remote control device 30, a frequency band of a communication signal between the transmitting module 20 and the remote control device 30, and a frequency band of a communication signal between the receiving module 10 and the transmitting module 20 may be different from one another. In this case, there is an advantage that minimizes interference between the communication signal between the receiving module 10 and the remote control device 30, the communication signal between the transmitting module 20 and the remote control device 30, and the communication signal between the receiving module 10 and the transmitting module 20.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

The invention claimed is:

1. A wireless display system comprising:
a receiver including a display; and
a transmitter configured to transmit, to the receiver, an image to be output by the display,
wherein each of the receiver and transmitter receives a control signal from a remote control device,
wherein the receiver is configured to transmit the control signal received from the remote control device to the transmitter, and
wherein the transmitter is configured to transmit the control signal received from the remote control device to the receiver.

2. The wireless display system of claim 1, wherein when the transmitter is included in a target of the control signal received from the remote control device, the receiver is configured to transmit, to the transmitter, the control signal received from the remote control device, and
wherein, when the receiver is included in the target of the control signal received from the remote control device, the transmitter is configured to transmit, to the receiver, the control signal received from the remote control device.

3. The wireless display system of claim 1, wherein the receiver comprises:
a first control signal receiver configured to receive the control signal from the remote control device;

a first control signal processor configured to obtain a control target of the control signal received by the first control signal receiver; and a first control signal transmitter configured to transmit the control signal to the transmitter when the transmitter is included in the control target of the control signal.

4. The wireless display system of claim 1, wherein the transmitter comprises:

a second control signal receiver configured to receive the control signal from the remote control device;

a second control signal processor configured to obtain a control target of the control signal received by the second control signal receiver; and a second control signal transmitter configured to transmit the control signal to the receiver when the receiver is included in the control target of the control signal.

5. The wireless display system of claim 1, wherein one of the receiver and the transmitter is configured to communicate with the remote control device through IR communication, and the other thereof is configured to communicate with the remote control device through short range wireless communication.

6. The wireless display system of claim 5, wherein the receiver is configured to receive the control signal from the remote control device through the IR communication, and wherein the transmitter is configured to receive the control signal from the remote control device through the short range wireless communication.

7. The wireless display system of claim 1, further comprising a remote control device including an IR communication module and a short range wireless communication module.

8. The wireless display system of claim 1, wherein at least one of the receiver and the transmitter that receives the control signal from the remote control device through short range wireless communication is configured to perform pairing with the remote control device.

9. The wireless display system of claim 1, wherein a frequency band of a communication signal between the receiver and the remote control device, a frequency band of a communication signal between the transmitter and the remote control device, and a frequency band of a communication signal between the receiver and the transmitter are different from one another.

10. A method for operating a wireless display system, the method comprising:

transmitting, by a transmitter, an audio/video (AV) signal to a receiver;

outputting, by the transmitter, an image according to the AV signal;

receiving, by the transmitter, a control signal from a remote control device and transmitting the control signal from the transmitter to the receiver; and receiving, by the receiver, the control signal from the remote control device and transmitting the control signal from the receiver to the transmitter.

11. The method of claim 10, further comprising:

determining, by one of the transmitter and the receiver that has received the control signal, whether the other thereof is included in a control target of the control signal.

12. The method of claim 10, wherein the receiving of the control signal from the remote control device comprises:

receiving, by the transmitter, the control signal from the remote control device through short range wireless communication; and receiving, by the receiver, the control signal from the remote control device through IR communication.

13. The method of claim 10, further comprising:

performing, by at least one of the receiver and the transmitter that receives the control signal from the remote control device through short range wireless communication, pairing with the remote control device.

* * * * *